United States Patent [19]

Kenmochi et al.

[11] Patent Number: 4,898,419
[45] Date of Patent: Feb. 6, 1990

[54] UNDERBODY STRUCTURE OF A MOTOR VEHICLE

[75] Inventors: Toshihisa Kenmochi; Tatsunori Nakamura, both of Wako, Japan

[73] Assignee: Honda Giken Kogyo Kabushiki Kaisha, Tokyo, Japan

[21] Appl. No.: 169,902

[22] Filed: Mar. 18, 1988

[30] Foreign Application Priority Data

Mar. 20, 1987 [JP] Japan ............... 62-40073[U]
Mar. 31, 1987 [JP] Japan ............... 62-46669[U]
May 28, 1987 [JP] Japan ............... 62-79844[U]

[51] Int. Cl.4 ............................................ B62D 21/00
[52] U.S. Cl. ...................................... 296/204; 52/806;
296/39.3; 296/97.23; 296/183; 296/185;
296/187; 296/191
[58] Field of Search ............ 296/39 A, 185, 187,
296/191, 204, 183, 208, 1 F, 31 R, 31 P, 39 R,
210, 39.2, 39.3, 97.23, 210; 52/806

[56] References Cited

U.S. PATENT DOCUMENTS

| | | | |
|---|---|---|---|
| 2,116,771 | 5/1935 | Seaman | 296/39 A X |
| 2,126,607 | 8/1938 | Boehner | 296/204 X |
| 3,177,031 | 4/1965 | Schilberg | 296/204 |
| 3,940,176 | 2/1976 | Ito et al. | 296/204 X |
| 4,081,197 | 3/1978 | Ackel | 296/204 |
| 4,129,330 | 12/1978 | Schwuchow | 296/204 |
| 4,175,631 | 11/1979 | Ishii et al. | 296/39 A X |
| 4,475,765 | 10/1984 | Vogt et al. | 296/210 |
| 4,585,086 | 4/1986 | Hiramatsu | 52/806 X |
| 4,593,949 | 6/1986 | Tanimoto | 296/204 |
| 4,606,959 | 8/1986 | Hillinger | 52/806 X |
| 4,712,829 | 12/1987 | Hurten et al. | 296/204 X |
| 4,730,870 | 3/1988 | DeRees | 296/197 |

FOREIGN PATENT DOCUMENTS

| | | | |
|---|---|---|---|
| 0693866 | 9/1964 | Canada | 296/208 |
| 0084267 | 5/1982 | Japan | 296/187 |
| 0218472 | 12/1983 | Japan | 296/1 F |
| 0249853 | 11/1986 | Japan | 296/39 A |

Primary Examiner—Margaret A. Focarino
Assistant Examiner—Andrew C. Pike
Attorney, Agent, or Firm—Armstrong, Nikaido, Marmelstein, Nikaido & Murray

[57] ABSTRACT

A floor panel disposed between a side sill and a center tunnel of a motor vehicle is constituted by a honeycomb panel having a honeycomb core which is sandwiched between an upper plate and a lower plate. The lower plate of the floor panel is formed integrally with a sill upper panel which defines the upper surface of the side sill and/or a tunnel panel which defines the upper surface of the center tunnel.

4 Claims, 3 Drawing Sheets

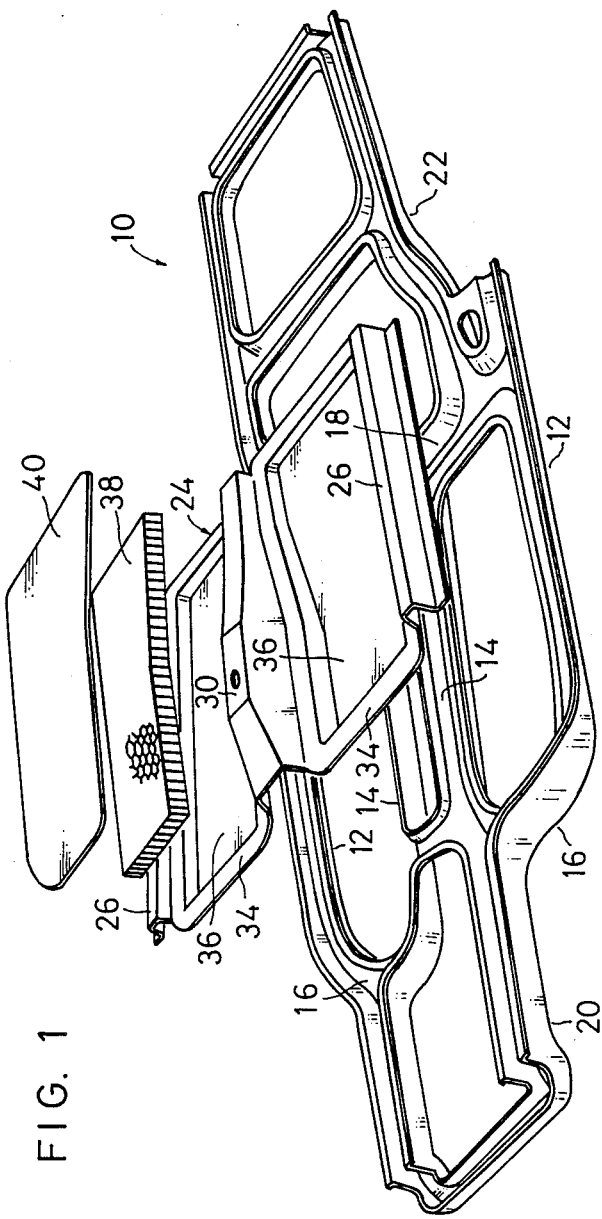
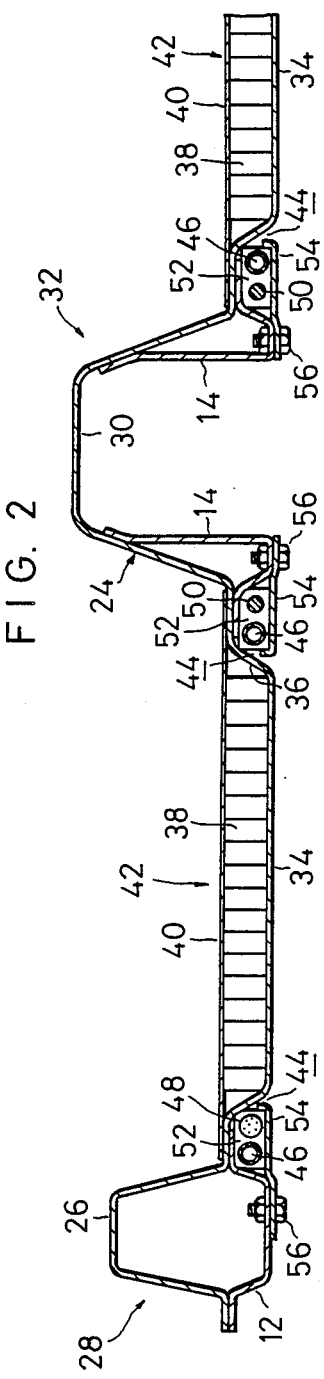
FIG. 1
FIG. 2

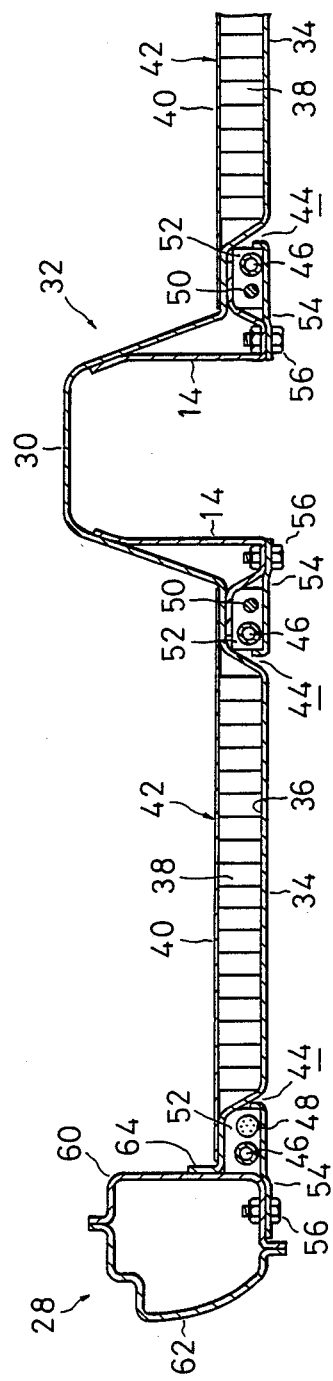
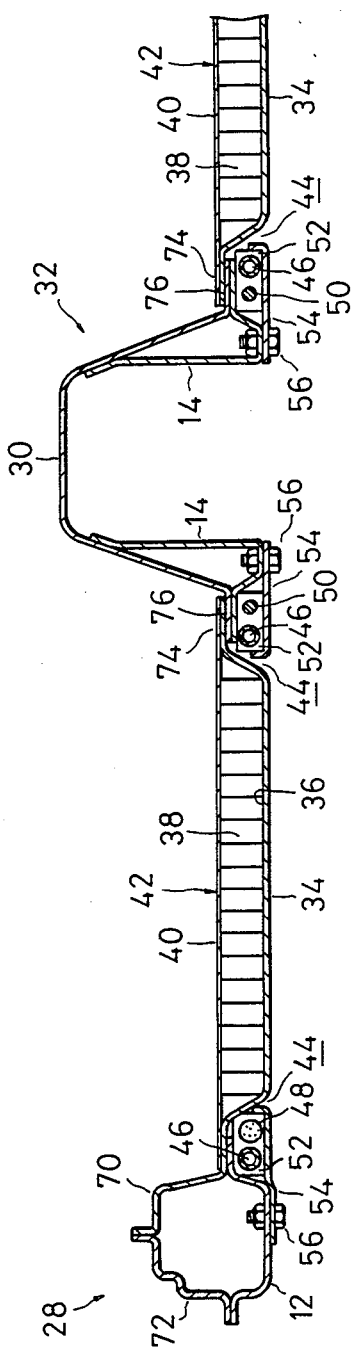

UNDERBODY STRUCTURE OF A MOTOR VEHICLE

BACKGROUND OF THE INVENTION

The present invention relates to an underbody structure of a motor vehicle and, more particularly, to an underbody structure of the type having a floor panel which includes a honeycomb core.

Traditionally, the underbody of a motor vehicle is constituted by longitudinally extending side sills, laterally extending cross members and others which are adapted to give mechanical strength to a body of the vehicle, and a floor panel positioned between those members. usually implemented with a single flat member, the floor panel is connected at laterally opposite sides thereof to the side sills by spot welding.

A prerequisite with a motor vehicle is that the floor of a passenger compartment be as flat as possible. In this respect, a floor panel implemented with a single flat member has a drawback that increasing the area of the flat portion for the floor panel reduces the rigidity of the flat portion and thereby causes the flat portion to vibrate when the vehicle body vibrates. Further, a floor panel with poor rigidity is incapable of serving the other expected functions, i.e., suppressing vibrations of the entire floor and intercepting noise otherwise transmitted to the passenger compartment.

In light of the above, it is a common practice to mount insulators or like sound insulating members on a floor panel together with cross members or like reinforcing members, so that sound insulation may be enhanced without affecting rigidity. However, such sound insulating members and reinforcing members not only increase the total weight of the vehicle body but also prevent the rigidity from being uniformly increased over the entire floor.

An implementation recently proposed to solve the above problems is replacing the conventional floor panel with a honeycomb panel which has a honeycomb core sandwiched between an upper and a lower plate and is extensively used with aircraft. Such a honeycomb panel is light weight and, yet, rigid while successfully damping vibrations and insulating sound. With a honeycomb panel, therefore, it is possible to realize a floor panel having an extremely wide flat portion inside of a passenger compartment.

A honeycomb panel stated above can hardly be shaped by pressing due to its considerable rigidity. Hence, when used for the floor panel of a motor vehicle, a honeycomb panel is applicable to flat portions only and not to a center tunnel portion and has to be rigidly connected to side sills and center tunnel. however, it is impracticable to connect a honeycomb panel to other members by simple spot welding because it includes a honeycomb core which is held between an upper and a lower plate and full of bores. The honeycomb core is often implemented with paper for the purpose of reducing the cost and therefore cannot be simply connected to other members by bolts and nuts. Should holes be formed through the honeycomb core, water would be admitted into the core through those holes to wet and break the core. In the aircraft art the holes for bolts are protected by special grommets as disclosed, for example, in U.S. Pat. Nos. 4,399,642 and 4,296,586. Such grommets, however, are not feasible for motor vehicles and the like which are produced on a quantity basis because they not only add to the cost but also permits no machining errors.

Furthermore, in the case that the floor panel is configured independently of the center tunnel and connected to the center tunnel as well as to the side sills, an existing assembly line for vehicle bodies has to be modified to a significant extent.

SUMMARY OF THE INVENTION

It is, therefore, an object of the present invention to provide an underbody of a motor vehicle having a honeycomb sandwich type floor panel which is light weight and, yet, rigid.

It is another object of the present invention to allow a floor panel to be implemented with a honeycomb sandwich structure while eliminating the need for the difficult operation of connecting a honeycomb panel to other members.

It is another object of the present invention to allow a floor panel to be implemented with a honeycomb sandwich structure without resorting to noticeable changes of an existing assembly line.

It is another object of the present invention to prevent water outside a passenger compartment from entering a honeycomb sandwich type floor panel and therefore from wetting and breaking the honeycomb core.

In order to achieve the above objects, a lower plate which forms a part of a honeycomb sandwich type floor panel is formed integrally with a panel which defines the upper surface of a center tunnel and/or a panel which defines the upper surface of a side sill, the center tunnel and the side sill each serving as a strength member of a vehicle body. A honeycomb core is bonded to the upper surface of the lower plate while an upper plate is bonded to the upper surface of the honeycomb core, whereby a honeycomb sandwich structure is provided.

In the above construction, the floor panel lower plate is analogous to a prior art floor panel which is implemented with a single flat member. hence, the lower plate can be produced and connected to a side sill or like reinforcing member by an existing vehicle body assembly line. Since the honeycomb core and the upper plate are bonded to the upper surface of the lower plate to provide the honeycomb sandwich structure, rigidly connecting a honeycomb panel to other members which is difficult is not needed. Moreover, the honeycomb core and upper plate can be bonded to the lower plate by using a step which is commonly included in a conventional vehicle body assembly line for mounting insulators and others, eliminating the need for noticeable modification of the assembly line. Since the lower plate is contiguous with the upper surface of the center tunnel or that of the side sill which defines an inner wall of a passenger compartment, the honeycomb core provided on the lower plate is fully isolated from the outside of the passenger compartment and is therefore prevented from becoming wet due to water from the outside of the passenger compartment.

In a preferred embodiment of the present invention, the floor panel upper plate is thinner than the floor panel lower plate. The lower plate is comparatively thick because it is unitary with the panel which constitutes the center tunnel or the side sill which is a reinforcing member of the vehicle body. Hence, the floor panel has sufficient strength despite that the upper plate is thin. The reduction in the thickness of the upper plate contributes to the reduction in the total weight of the vehicle body. Since the weight of the floor panel centralizes in a lower part of the panel, the center of gravity of the vehicle body is lowered to enhance stable steering.

Preferably, the lower plate is provided with a recessed portion for receiving the honeycomb core. The upper plate is laid on and bonded to the lower plate around the recessed portion of the latter, so that the floor of a passenger compartment may become entirely flat. Such a configuration of the lower plate increases the rigidity of the lower plate and thereby prevents the lower plate from being deformed before being assembled into the honeycomb sandwich structure, whereby the ease of assembly of a vehicle body is promoted. Further, the lower surface of the recessed portion cooperates with the lower surfaces of the side sill and other strength members to define bottom-open channels in which various wirings and pipings may be nested for the protection from obstacles. The lower ends of the channels may individually closed by covers to make the underside of a vehicle body flat and thereby reduce air resistance.

BRIEF DESCRIPTION OF THE DRAWINGS

The above and other objects, features and advantages of the present invention will become more apparent from the following detailed description taken with the accompanying drawings in which:

FIG. 1 is an exploded perspective view of an underbody of a motor vehicle embodying the present invention;

FIG. 2 is a vertical section of the underbody of FIG. 1 taken in the lateral direction of the vehicle body;

FIG. 4 is a view similar to FIG. 2, showing another embodiment of the present invention; and FIG. 5 is a view similar to FIG. 2, showing still another embodiment of the present invention.

DESCRIPTION OF PREFERRED EMBODIMENTS

Figure 3:
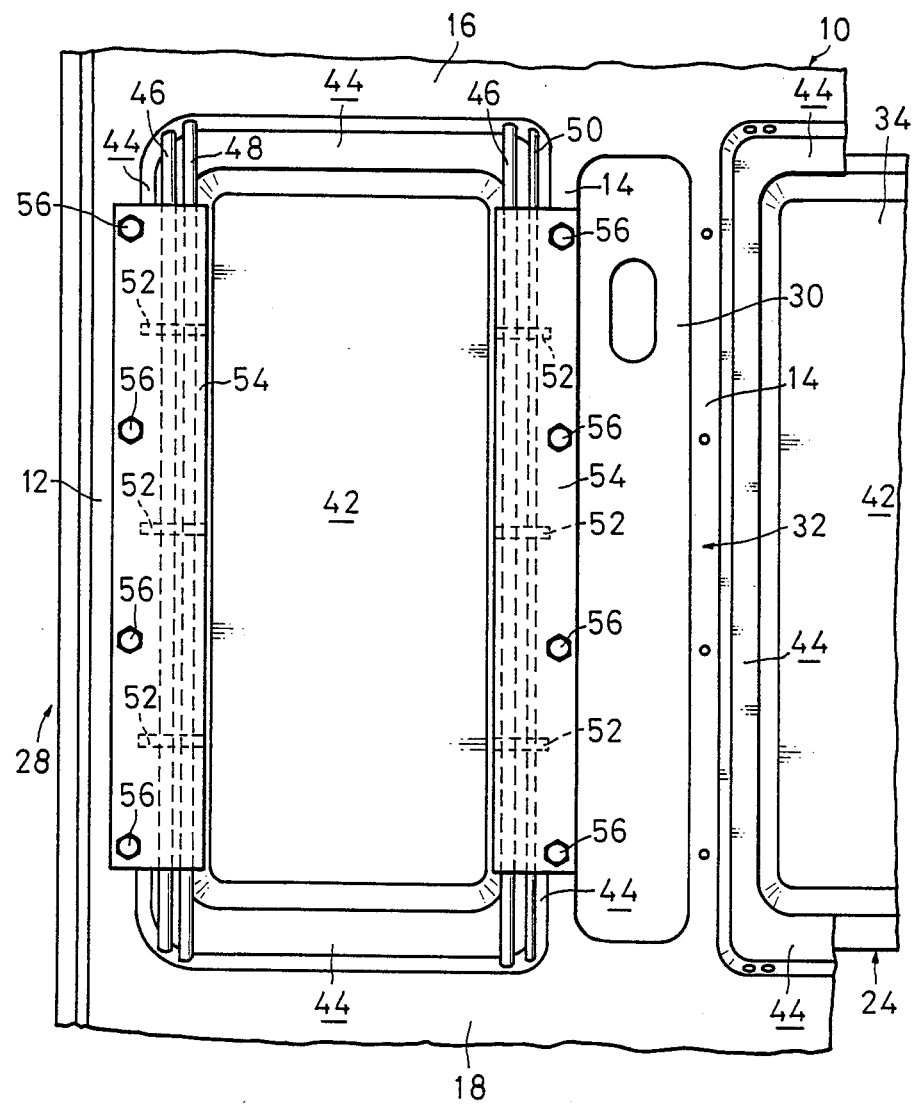
FIG. 3 is a bottom view of the underbody.

Referring to FIG. 1 of the drawings, an underbody in accordance with the present invention is shown and includes an unitary underframe 10 which is produced by press-forming sheet steel. As shown, the underframe 10 includes side sill lower panels 12 and 12 which are located in a position where the floor of a passenger compartment will be provided. The lower panels 12 and 12 each extends in the longitudinal direction of a body of the vehicle at a respective side of the body. The underframe 10 also includes a pair of center frames 14 and 14 which individually extend in the longitudinal direction of the vehicle body in a central part of the vehicle body between the side sill lower panels 12 and 12. The sill lower panels 12 and 12 and the center frames 14 and 14 are interconnected at their opposite ends by a front cross member 16 and a middle cross member 18 which individually extend in the lateral direction of the vehicle body. A front frame 20 extends from the front end of the front cross member 16 while a rear frame 22 extends from the rear end of the middle cross member 18.

As shown in FIGS. 1 and 2, both the sill lower panels 12 and the center frames 14 are provided with a top-open channel-like configuration. A relatively large panel 24 is constituted by single sheet steel and rigidly connected to the upper surfaces of the sill lower panels 12 and center frames 14. Bridging the sill lower panel 12 and 12, the panel 24 is provided at its laterally opposite sides, which individually face the sill lower panels 12 and 12, with bottom-open channel-like side sill upper panels 26 and 26. Each sill lower panel 12 and its associated sill upper panel 26 are joined and rigidly connected together to form a side sill 28 which has a hollow closed section. The side sills 28 serve as reinforcing members.

The panel 24 includes a bottom-open channel-like tunnel panel 30 which is located at the center of the panel 24. The tunnel panel 30 is positioned to straddle the center frames 14 and 14 and connected to the latter to define a center tunnel 32. As shown in FIG. 2, the center tunnel 32 has hollow closed reinforcing portions in lower portions of opposite sides thereof. In this sense, the center tunnel 32 serve as a reinforcing member also.

That part of the panel 24 defined between each sill upper panel 26 and the tunnel panel 30 constitutes a lower plate 34 of the floor panel. The lower plate 34 is recessed except for its peripheral portion so as to form a recess 36 having a substantial area and a flat bottom. A honeycomb core 38 having a thickness which is equal to the depth of the recess 36 is received in the recess 36. The honeycomb core 38 is made of paper and bonded to the bottom of the recess 36. An upper plate 40 is bonded to the upper surface of the honeycomb core 38. The peripheral portions of the upper plate 40 are laid on the lower plate 34 around the recess 36 and bonded thereto by sealant.

In the above construction, each side sill 28 and the center tunnel 32 cooperate to form a honeycomb sandwich type floor panel 42 having the honeycomb core 38 which is interposed between the upper and lower plates 40 and 34. The lower plate 34 is integral with the sill upper panel 26 which constitutes the upper wall of the side sill 28 which is a reinforcing member, and the tunnel panel 30 which constitutes the upper wall of the center tunnel 32 which is a reinforcing member also. Hence, the lower plate 34 has the same thickness as the panels 26 and 30, i.e., a substantial thickness which is almost the same as that of a traditional floor panel implemented with a single flat member. On the other hand, the upper plate 40 is far thinner than the lower plate 34.

The floor panel 42 has such a thickness that its lower surface is substantially flush with the surface of the lowermost portion of the underframe 10, i.e., the lower surfaces of the sill lower panel 12, center frame 14, front cross member 16 and middle cross member 18. Hence, as shown in FIGS. 2 and 3, bottom-open channels 44 are defined between the floor panel 42 and the various reinforcing members which support and surround the floor panel 42, i.e., side sill 28, center tunnel 32, front cross member 16, and middle cross member 18 at the underside of the assembly. The channels 44 extend in the longitudinal direction of the vehicle body at both sides of the floor panel 42, i.e., between each side sill 28 and the center tunnel 32. As illustrated, the channels 44 are available for accommodating various connecting members which extend from the front side to the rear side of a vehicle body and include pipings 46 such as a fuel pipe communicating an engine and a fuel tank which are respectively mounted in a front and a rear part of the vehicle body, a brake pipe interconnecting front and rear wheels, and a hydraulic conduitwork of a hydraulically operated four-wheel steering device, wirings 48 such as a wire harness which interconnect a battery and tail lamps and others, and transmission rods 50 of a mechanically operated four-wheel steering device. Each of such connecting members 46, 48 and 50 is supported by a plurality of brackets 52 which are positioned at longitudinally spaced locations and are in turn supported by a cover 54, which covers the open bottom of any of the channels 44 associated therewith. The cover 54 is fastened by bolts 56 to the underside of the sill lower panel 12 and that of the center frame 14.

To assemble the underbody having the above structure, the underframe 10 is formed by a vehicle body assembly line in the same manner as a conventional underframe while, at the same time, the panel 24 is formed in the same manner as a coventional floor panel. The underframe 10 and the panel 24 are joined and rigidly connected together by spot welding and then painted as usual. The honeycomb core 38 and upper plate 40 are each cut in the predetermined shape and then bonded together by a line which is independent of the vehicle body assembly line. The subassembly of the honeycomb core 38 and upper plate 40 is bonded to the lower plate 34 at a suitable step which follows the painting step of the vehicle body assembly line, e.g. a step of mounting insulators. The connecting members 46, 48 and 50 are mounted in the conventional manner. This allows an existing vehicle body assembly line to be used without any noticeable modification.

The honeycomb sandwich type floor panel 42 is formed integrally with the side sill 28 and center tunnel 32, as stated earlier. That is, the floor panel 42 is firmly connected to the side sill 28 and center tunnel 32 and therefore surely damps vibrations. The single continuous panel 24 serves to sealingly isolate a passenger compartment from the space below, whereby noise from the road side is fully intercepted. Further, since the honeycomb core 38 is laid on the upper surface of the panel 24, i.e., on the passenger compartment side, not only water from the outside of the vehicle body but also water entered the cavity of the side sill 28 and center tunnel 32 is prevented from reaching the honeycomb core 38. It follows that the honeycomb core 38 made of paper is prevented from being weakened and broken by water.

Directly facing the road surface, the lower plate 34 of the floor panel 42 is apt to suffer from damage and therefore rust due to pebbles and others which are caused to leap from the road surface. Nevertheless, the lower plate 34 having substantially the same thickness as the conventional single sheet type floor panel will not be easily holed although it may get rusty. This insures durability of the floor panel. Even when the function particular to the honeycomb sandswich structure is lost due to separation of the honeycomb core 38 from the upper plate 40 or lower plate 34 or due to breakage of the honeycomb core 38 which may occur for one reason or another, the lower plate 34 guarantees substantially the same degree of rigidity as the conventional floor panel.

The upper plate 40 of the floor panel 42 is physically entirely independent of the side sill 28, center tunnel 32 and the like, so that it can be provided with any desired thickness. This, coupled with the fact that the lower plate 34 itself has strength and rigidity required for a floor panel, makes it needless to provide the upper plate 40 with great rigidity. That is, the upper plate 40 needs only to play a complementary role in constituting the sandwich structure. For this reason, the upper plate 40 may be formed thin and made of a light material such as aluminum, resin or paper. Such a light upper plate 40 effectively minimizes the increase in the total weight of the floor panel 42 which is ascribable to the honeycomb sandswich structure. In addition, since the lower plate 34 is heavier than any of the upper plate 40 and honeycomb core 38, the weight of the floor panel 42 centralizes in the lower part of the panel 42 with the result that the center of gravity of the vehicle body is lowered to enhance stability.

The recess 36 formed in the lower plate 34 contributes to the increase in the rigidity of the plate 34 by virtue of its inherent configuration. Hence, even when the panel 24 is transported alone, it surely maintains its original shape and therefore can be mounted on the underframe 10 accurately and easily. Despite that the relatively thick honeycomb sandwich structure of the floor panel 42 is constituted by placing the honeycomb core 38 in the recess 36 and laying the peripheral portion of the upper plate 40 on that of the lower plate 34 which defines the recess 36, the floor of the passenger compartment is practically flat or stepless.

As previously stated, the channels 44 are defined between the floor panel 42 and the side sill 28 and center tunnel 32 by the downward protuberance of the lower plate 34. In the case that the pipings 46, wirings 48, transmission rods 50 and other similar members are nested in those channels 44, i.e., above the underside of the underbody, they will surely be protected by the highly rigid floor panel 42 and the side sill 28 or center tunnel 32 when the bottom of the vehicle body is caused into contact with an obstacle such as a stepped road surface. In addition, the covers 54 adapted to close the channels 44 provide the vehicle body with flat underside which entails a minimum of air resistance during cruising.

Referring to FIG. 4, another embodiment of the present invention is shown in which each side sill 28 is constituted by a sill inner panel 60 and a sill outer panel 62. While the lower panel 34 of the floor pane 42 is formed integrally with the tunnel panel 30 which defines the center tunnel 32, it is formed independently of the side sill 28. Specifically, the lower plate 34 is provided with a flange 64 at the outer edge thereof and spot-welded to the inner side of the sill inner panel 60 via the flange 64. The honeycomb core 38 is bonded to the bottom of the recess 36 of the lower plate 34 while the upper plate 40 is bonded to the top of the honeycomb core 38, whereby the honeycomb sandwich type floor panel 42 is completed. The rest of the construction is the same as that of the embodiment which has been described with reference to FIGS. 1 to 3.

In the structure shown in FIG. 4, the side sill 28 and the lower plate 34 of the floor panel 42 are substantially identical with a prior art side sill and a prior art floor panel, respectively. It follows that the vehicle body can be assembled without resorting to changes of an existing vehicle body assembly line.

Referring to FIG. 5, still another embodiment of the present invention is shown. As shown, the side sill 28 includes a sill upper panel which is made up of an upper inner panel 70 and an upper outer panel 72. The upper inner panel 70 is unitary with the lower plate 34 of the floor panel 42. The lower plate 34 is formed independently of the center tunnel 32 and rigidly connected to the latter at a flange 74 thereof. Specifically, the flange 74 is provided at the edge of the lower plate 34 adjacent to the center of the vehicle body and bonded to a horizontal flange 76 which is constituted by the tunnel panel 30 of the center tunnel 32 and the center frame 14. The other structural parts and elements are similar to those shown in FIGS. 1 to 3. This embodiment offers various advantages which are comparable with those of the previous embodiments.

Various modifications will become possible for those skilled in the art after receiving the teachings of the present disclosure without departing from the scope thereof.

What is claimed is:

1. An underbody of a motor vehicle having a plurality of strength members which give strength to a body of said vehicle and individually extend in a longitudinal direction of said body of said vehicle, and a floor panel disposed between said strength members, said floor panel comprising:

a honeycomb sandwich structure having an upper plate, a lower plate, and a honeycomb core interposed between said upper plate and a recessed portion of said lower plate, wherein said recessed portion has a periphery for accommodating said upper plate, and wherein said lower plate is integrally formed with a panel for defining an upper surface of said strength members.

2. An underbody as claimed in claim 1, wherein a lower surface of said recessed portion and lower surfaces of said strength members define bottom-open channels therebetween, connecting members which interconnect first members which are mounted in a front part of said body and second members which are mounted in a rear part of said body being received in said channels.

3. An underbody as claimed in claim 2, wherein lower ends of said channels are each closed by a cover.

4. An underbody as claimed in claim 1, wherein a peripheral portion of said upper plate is laid on and bonded to said lower plate around said recessed portion.

* * * * *